(12) United States Patent
Bishop et al.

(10) Patent No.: US 9,993,105 B2
(45) Date of Patent: Jun. 12, 2018

(54) METHOD OF MAKING A BEVERAGE WITH A CONTROLLABLE BREWER

(71) Applicant: BUNN-O-MATIC CORPORATION, Springfield, IL (US)

(72) Inventors: John D. Bishop, Springfield, IL (US); Charles H. Clark, Springfield, IL (US); William E. Midden, Springfield, IL (US); Randy D. Pope, Springfield, IL (US); Suresh Radhakrishnan, Springfield, IL (US); Rex Allen Rogers, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days. days.

(21) Appl. No.: 14/679,849

(22) Filed: Apr. 6, 2015

(65) Prior Publication Data
US 2015/0208850 A1 Jul. 30, 2015

Related U.S. Application Data

(63) Continuation-in-part of application No. 13/130,511, filed as application No. PCT/US2009/006268 on (Continued)

(51) Int. Cl.
*A47J 31/043* (2006.01)
*A23L 2/52* (2006.01)
(Continued)

(52) U.S. Cl.
CPC .............. *A47J 31/043* (2013.01); *A23L 2/52* (2013.01); *A23L 2/54* (2013.01); *A47J 31/32* (2013.01)

(58) Field of Classification Search
CPC . A47J 31/32; A47J 31/043; A23L 2/52; A23L 2/54
See application file for complete search history.

(56) References Cited

U.S. PATENT DOCUMENTS

| 373,420 A | 11/1887 | Suits |
| 2,569,820 A | 10/1951 | Locke |
| (Continued) | | |

FOREIGN PATENT DOCUMENTS

| CN | 1935070 | 3/2007 |
| DE | 2432141 | 1/1976 |
| (Continued) | | |

OTHER PUBLICATIONS

English Translation for JP 11-221155 published Aug. 1999.*
Opposition submitted in EP App. No. 09827899.7 (2015).
U.S. Appl. No. 13/130,511, filed May 20, 2011.

*Primary Examiner* — Anthony Weier
(74) *Attorney, Agent, or Firm* — Barnes & Thornburg LLP

(57) ABSTRACT

The present application relates to apparatus, systems, and methods of use for producing beverages. The apparatus includes components and methods for facilitating beverage production applying water or other liquid in combination with a brewing substance and controlled aeration and pressurization of a mixing vessel or column. The aeration of the water and brewing substance can be accomplished with a vacuum system, a positive pressurization system, and a combination of such systems. The apparatus, systems, and methods can be used with a variety of beverage making devices such as a device which might be used to controllably produce volumes of beverage to a reservoir. The methods include controllable aeration and pressurization of the vessel for brewing which may include controlling extraction time, steep time, active controllable agitation of the brewing (Continued)

substance, as well as other brewing characteristics, features, and actions.

4 Claims, 10 Drawing Sheets

Related U.S. Application Data

Nov. 20, 2009, now Pat. No. 8,998,176, application No. 14/679,849, which is a continuation-in-part of application No. 12/990,574, filed as application No. PCT/US2009/042604 on May 1, 2009, now Pat. No. 8,997,633.

(60) Provisional application No. 61/116,317, filed on Nov. 20, 2008, provisional application No. 61/049,564, filed on May 1, 2008.

(51) Int. Cl.
*A23L 2/54* (2006.01)
*A47J 31/32* (2006.01)

(56) References Cited

U.S. PATENT DOCUMENTS

| | | |
|---|---|---|
| 2,660,948 A | 12/1953 | Forschner |
| 3,288,049 A | 11/1966 | Schmid et al. |
| 3,552,976 A | 1/1971 | King |
| 3,992,983 A | 11/1976 | Gasser et al. |
| 4,632,023 A | 12/1986 | King |
| 4,644,855 A | 2/1987 | Woolman et al. |
| 4,779,520 A | 10/1988 | Häuslein |
| 4,791,859 A | 12/1988 | King |
| 4,823,685 A | 4/1989 | Boumans et al. |
| 4,953,725 A | 9/1990 | Gil Buj |
| 4,967,647 A | 11/1990 | King |
| 5,127,317 A | 7/1992 | Takayanagi et al. |
| 5,197,373 A | 3/1993 | De Jong |
| 5,297,472 A | 3/1994 | Suzuki et al. |
| 5,309,820 A * | 5/1994 | Baxter .............. A47J 31/043 99/280 |
| 5,312,637 A | 5/1994 | Midden |
| 5,937,738 A | 8/1999 | Okamura et al. |
| 5,957,035 A | 9/1999 | Richter |
| 6,079,314 A * | 6/2000 | Mackinnon .......... A47J 31/60 99/289 R |
| 6,079,317 A | 6/2000 | Fukushima et al. |
| 6,220,147 B1 | 4/2001 | Priley |
| 6,250,208 B1 | 6/2001 | Helps et al. |
| 6,279,461 B1 | 8/2001 | Fukushima et al. |
| 6,324,964 B1 | 12/2001 | Niederberger et al. |
| 6,488,976 B1 | 12/2002 | Priley |
| 6,564,697 B2 | 5/2003 | Maxwell et al. |
| 6,722,265 B2 | 4/2004 | Priley |
| 6,887,506 B2 | 5/2005 | Kalenian |
| 6,973,869 B1 | 12/2005 | Lin |
| 7,717,026 B1 | 5/2010 | Lassota |
| 7,849,784 B2 | 12/2010 | Adler |
| 8,124,150 B2 | 2/2012 | Doglioni |
| 8,286,547 B1 | 10/2012 | Lassota |
| 2006/0174773 A1* | 8/2006 | Taylor ................ A47J 31/46 99/280 |
| 2006/0230946 A1 | 10/2006 | Cheng |
| 2007/0034083 A1 | 2/2007 | Van Hattem et al. |
| 2009/0317526 A1 | 12/2009 | Tacklind et al. |
| 2010/0203207 A1 | 8/2010 | Clark et al. |
| 2011/0097466 A1 | 4/2011 | Vastardis |

FOREIGN PATENT DOCUMENTS

| | | |
|---|---|---|
| EP | 2446785 | 5/2012 |
| FR | 1565033 | 4/1969 |
| JP | H01-234992 | 9/1989 |
| JP | 11-221155 * | 8/1999 |
| WO | WO 86/05670 | 10/1986 |
| WO | WO 88/02612 | 4/1988 |
| WO | WO 91/01673 | 2/1991 |
| WO | WO 93/15640 | 8/1993 |
| WO | WO 2007/042485 | 4/2007 |
| WO | WO 2009/135177 | 11/2009 |

* cited by examiner

METHOD OF MAKING A BEVERAGE WITH A CONTROLLABLE BREWER

CROSS REFERENCE TO RELATED APPLICATIONS

This application is a Continuation-in-Part of copending U.S. patent application Ser. No. 13/130,511, filed Nov. 21, 2011, now U.S. Pat. No. 8998176, which is a U.S. nationalization under 35 U.S.C. § 371 of International Application No. PCT/US2009/006268, filed Nov. 20, 2009, which claims the benefit of priority under 35 U.S.C. § 119(e) to U.S. Provisional Patent Application No. 61/116,317, filed Nov. 20, 2008. This application is also a Continuation-in-Part of copending U.S. patent application Ser. No. 12/990,574, filed Nov. 1, 2010, now U.S. Pat. No. 8997633,which is a U.S. nationalization under 35 U.S.C. § 371 of International Application No. PCT/US2009/042604, filed May 1, 2009, which claims priority under 35 U.S.C. § 119(e) to U.S. Provisional Patent Application No. 61/049,564, filed May 1, 2008. The disclosures set forth in the referenced applications are incorporated herein by reference in their entireties.

BACKGROUND

The present disclosure relates to apparatus, systems, and methods of use for producing beverages. The apparatus includes components and methods for facilitating beverage production applying water or other liquid in combination with controlling the pressure in a mixing vessel or column. The apparatus, systems and methods can be used with a variety of beverage making devices such as a device which might be used to controllably produce volumes of beverage to a reservoir. The methods include controllable pressurized brewing which may include controlling pressurization (either or both positive and negative pressure in a cavity defined at least in part by the vessel), extraction time, steep time, active controllable agitation of the brewing substance, as well as other brewing characteristics, features, and actions.

Reference is also made to U.S. Provisional Application Nos. 61/039,071 filed Mar. 24, 2008, 61/049,564 filed May 1, 2008, and 61/100,537 filed Sep. 26, 2008, and PCT Patent Application Numbers PCT/US09/38125 filed Mar. 24, 2008 and PCT/US09/042604 filed May 1, 2009 which are incorporated by reference in the entirety. Additionally, any applications related to U.S. Provisional Application Nos. 61/039,071 filed Mar. 24, 2008, 61/049,564 filed May 1, 2008, and 61/100,537 filed Sep. 26, 2008, and PCT Patent Application Numbers PCT/US09/38125 filed Mar. 24, 2008 and PCT/US09/042604 filed May 1, 2009 either as applications, non-provisional applications, or issued patents are incorporated herein by reference in their entirety.

A variety of beverage producing systems have been produced. One form of beverage production is referred to as "brewing". Brewing involves the dispensing of water into a brewing substance, such as coffee, tea, herbs, botanicals, as well as other substances. In the brewing process, the water infuses and extracts flavors from the brewing substance. The brewing substance and water is contained within a filter structure to allow beverage to drain from the infused brewing substance and water mixture. The brewing process often uses heated water but may use other liquids and may use the water or other liquids provided at temperatures over a wide range. In other words, while brewing often uses heated water, there are also brewing techniques that use unheated or chilled water.

A variety of brewing apparatus and systems have been developed. Drip brewing systems allow the beverage to drain through a filter under force of gravity. An example of a drip brewing system involves a brewing substance holder, often referred to as a funnel which contains the brewing substance and receives water for mixing with the brewing substance. The funnel is lined with a filter material, either disposable or reusable. The brewing substance is placed in the filter of the funnel and water is dispensed over the brewing substance. Beverage drains from the filter through an opening in the funnel for dispensing into a cup or larger container such as a carafe.

Some automated systems have been developed which employ a brewing chamber constructed to provide or approximate the function of a substance holder and filter. The automated mechanism includes a piston which moves through a central portion of the chamber to controllably open and close a drain area within the chamber. The controllable piston also includes a water line which can be used to controllably dispense water over brewing substance contained in the chamber. This system generally works on principles similar to the drip brewing system such that gravity or some other force is employed, at least in part, to drain beverage from the system.

Another form of brewing system involves a technique referred to as "French press". In a French press system coffee is placed in a container and water is poured over the coffee and generally, is maintained in direct contact for the duration of the brewing process. The heated water is mixed with the brewing substance to produce a beverage. A plunger which includes a filter is placed in the container and pressed downwardly over the water and brewing substance mixture. Beverage passes through the filter and remains on top of the filter with the remaining spent brewing substance being trapped between the plunger filter and the bottom of the container. The brewed beverage can then be dispensed from the container.

Another version of an automated brewing apparatus has often been used in the cup dispensing vending machine industry. This form of brewing technique uses a piston moving within a chamber to provide a suction-type of French press technique. In this vending system, coffee is dispensed into a brewing chamber. Water is combined with the coffee and may be allowed to steep. The piston is moved to draw the brewed beverage through a filter under force of suction and allow brewed beverage to drain from the chamber. The spent grounds are then removed from the filter in preparation for subsequent brewing cycle.

One of the problems with some of the foregoing techniques is that while they are capable of producing sufficient beverages, they will require significant interaction and control of numerous parts. Additionally, the numerous moving parts require contact with the brewing mixture or slurry. Additional contact components as well as moving components may require additional cost, maintenance, reliability and other issues.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying at least the best mode of carrying out the disclosure as presently perceived.

DETAILED DESCRIPTION

Figure 1:
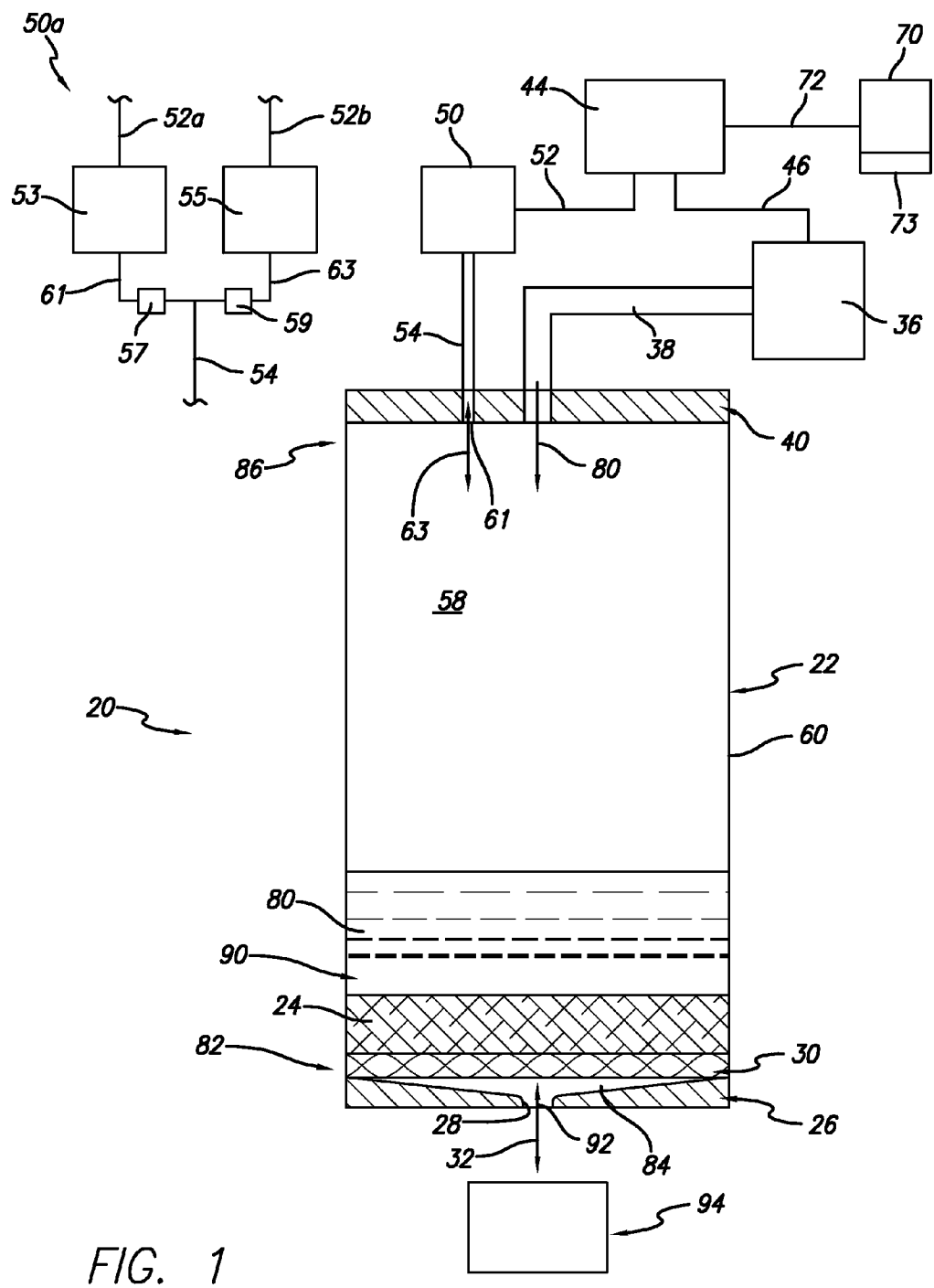
FIG. 1 is a diagrammatic illustration of a beverage producing apparatus which includes a heated water delivery system, an air moving device, a controller coupled to the water delivery system and the air moving device and a user interface coupled to the controller, a mixing vessel or column receives beverage making substance and water for mixture as a slurry for production of a beverage which is moved through a filter for dispensing into a container.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

With reference to FIG. 1, a beverage making or producing and dispensing apparatus 20 is disclosed. The beverage producing and dispensing apparatus 20 includes an at least partially hollow mixing vessel or column 22 for receiving a charge of beverage making substance or material 24. The vessel 22 includes a first end shown in the illustration as a bottom 26 with an aperture 28. A filter structure 30 is provided between the beverage making substance 24 and the bottom 26 to facilitate separation of the beverage making substance 24 from beverage 32 dispensed through the aperture 28. The bottom 26 and a top 40 may be permanently or removably affixed to the vessel 22. In some applications of the apparatus 20 it may be desirable to allow the vessel 22 to be removed from the apparatus 20 for cleaning. A bottom is referred to only by way of illustration and not limitation. It will be understood that this term is to be broadly interpreted to include other orientations of the first end 26 of the present beverage making and dispensing apparatus 20.

A controllable liquid water delivery system 36 of generally known construction communicates with the vessel 22. For example, the water delivery system 36 can be in the form of a heated water system which can either be connected to a pressurized water source, can receive manually delivered quantities of water, or a combination of manual and automatic or controllable sources. The water delivery system 36 is associated with a device for heating the water and systems for controllably delivering it via line 38 through a second end shown in the illustration as a top 40 of the vessel 22. The water delivery system 36 is coupled to a controller 44 via line 46. The water delivery system may include a reservoir for retaining a volume of water in a heated condition and a heating element associated with the reservoir for providing energy to heat the water. The water delivery system may include a temperature sensor and a level sensor for detecting the condition of the water in the water delivery system to provide information for control of the water delivery system. Water is referred to only by way of illustration and not limitation. It will be understood that this term is to be broadly interpreted to include any liquid as well as any combination of liquid ingredients used in making beverages. A top is referred to only by way of illustration and not limitation. It will be understood that this term is to be broadly interpreted to include other orientations of the second end 40 of the present beverage making and dispensing apparatus 20.

In addition to controlling water delivery system, the controller 44 may also control process parameters required to achieve the necessary quantity of the beverage made using the apparatus. A controllable water delivery system 36, may be replaced or added with additional storage tanks holding aroma solution, sugar solution, milk or any other liquid, powder, gaseous, or solid dispensers to add flavors, appearances, or characteristics to the beverage produced. The top 40 may be fixed in the machine to provide a sealing location between the vessel 22 and the machine.

An air moving system 50 is controllably coupled to the controller 44 over line 52. A passage 54 is coupled to the air moving system 50 to place the air mover 50 in controllable communication with an internal cavity 58 of the vessel 22. The cavity 58 is generally defined by at least one wall 60 of the vessel 22. The air moving system 50 is capable of controllably removing (61) air from the vessel 58 or introducing (63) air to the vessel 22. In other words, in one mode of operation the air moving system 50 can controllably create a negative pressure in the vessel 22 or draw a vacuum (61) on the cavity 58 of the vessel 22 by controllably removing the air in a vacuum mode of operation. Additionally, in another mode of operation the air moving system 50 can controllably create a positive pressure in the vessel 22, such as by controllably pumping air into (63) the vessel to pressurize (63) the cavity 58 in a pumping mode of operation.

A user interface 70 is coupled to the controller 44 over line 72 to facilitate the controlled operation of the apparatus 20. Additionally, the controller 44 can provide information to a user interface 70 such as by way of a visual, audio, or other display or feedback system. Additionally, any variety of communication interfaces 73 might be implemented at the user interface 70 or elsewhere coupled to and associated with the apparatus 20. Such a variety of interfaces might include card readers, RFID readers, barcode readers, biometric devices or any other form of device, now known or hereafter discovered and usable with the disclosed beverage producing and dispensing apparatus, which can provide information to or receive information from a user or other source for use in the beverage preparation process of the apparatus 20. The interfaces may be physical, wired, or wireless. The reference to the user interface 70 and communication interface 73 is intended to be broadly interpreted and not limited by the disclosure provided herewith.

The present disclosure is intended to be a broad disclosure relating to the structures and methods for producing beverage using the teachings of the present beverage producing and dispensing apparatus 20. The present disclosure should be understood to be applicable for use with a variety of manual, semiautomatic, or automatic beverage making apparatus including, but not limited to, brewing systems. One of skill in the art empowered with the teachings as provided herein can find utility and application for this disclosure in a variety of mechanisms and systems.

It should be noted that the present disclosure may refer to coffee in reference to beverage making substance throughout the remainder of the description in the interest of clarity and simplicity. It will be understood, however, that any form of beverage making substance may be used to produce a beverage and the term coffee is intended to be broadly interpreted. This broad interpretation is also intended to include, but is not limited to, beverage substances including but not limited to, coffee, tea, herbs, botanicals, liquid beverage concentrate, ground, pulverized, rough cut, whole, powdered beverage concentrate, flaked, granular, freeze dried or other forms of materials including, but not limited to, liquid, gel, crystal or obtain a beverage or other food product or any other forms of beverage substance or food products. Terms including beverage, brewed, brewing, brewing substance, brewed liquid, and brewed beverage as may be used herein are intended to be broadly defined as including, but not limited to, the brewing of coffee, tea, and any other beverages. This broad interpretation is also intended to include, but is not limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. While a heated liquid is referred to herein it should be understood that reference to temperature is provided by way of illustration and not limitation and should be broadly interpreted. It should be understood that a beverage may be made to accommodate a recipe using heated, unheated, chilled or liquid within any range of temperature. Also, the volume or quantity of the beverage making substance used in the system or the beverage produced by the system is intended to be broadly interpreted and not limited to that as specifically disclosed and includes serving sizes ranging from single cup to multiple cup containers, shown generally by container 94.

With further reference to FIG. 1, the apparatus 20 is used in one example to produce a brewed beverage 32 by a process which infuses a beverage making substance 24 such as coffee with a brewing substance such as water 80. In this example, beverage making substance 24 is dispensed into the cavity 58 of the mixing vessel 22. The lower portion 82 of the vessel 22 is at least removably secured to a base 26 with the filter 30 positioned thereabove. In at least one embodiment, a gap 84 is provided between the filter 30 and a corresponding surface of the bottom for draining brewed beverage 32 through the filter 30 and from the vessel 22.

The upper portion, cover, or top 40 is at least removably attached to the upper area 86 of the vessel 22. The waterline or passage 38 and air passage 54 are at least removably coupled to the cover 40 and communicate with the cavity 58.

After brewing substance 24 is dispensed into the cavity 58 water 80 is dispensed from the water delivery system 36 via water delivery line 38. Water mixed with the beverage making substance 24 creates a slurry 90 or combination of water 80 and brewing substance 24. The heated water and coffee mixture allows the desirable characteristics of the coffee to be extracted therefrom and drained from the vessel 22 through the aperture 28.

The opening or aperture 28 in the base 26 is sized and dimensioned to allow beverage to flow from the vessel 22. In order to prevent water 80 and/or beverage 32 from flowing from the vessel prematurely, the air moving device 50 can be controlled by the controller 44 to create a negative pressure in the cavity 58, or in other words, a suction or vacuum through the aperture 28. The air moving device 50 can be controlled to maintain the slurry 90 in the cavity 58 with out dripping form the aperture 28 or creating a bubbling or agitation of air flowing through the slurry 90. In other words, the vacuum can be controlled to create a vacuum pressure which is generally equal to the forces, such as gravity, which would otherwise allow the beverage to flow from the aperture 28. The negative pressure controllably induced on the vessel by the air moving device 50 can be controllably increased to draw air 92 up through the aperture 28 and into the slurry 90. This tends to create a bubbling of the beverage making slurry which agitates the slurry in the vessel 22. The infusion of air into the slurry helps to promote full engagement of the beverage making substance and development of characteristics in the brewed beverage which is ultimately extracted from the slurry 90. Air drawn through the aperture 28 is exhausted from the system through the air moving device 50.

At a predetermined point of this process, the air moving device 50 can be operated to create a positive pressure in the cavity 58 thereby creating pressure in the open space above the slurry 90 to drive the slurry against the filter 30. As a consequence of the increase in pressure, beverage will be drained, driven, or otherwise separated from the slurry through the filter 30 and out through the aperture 28. The filter 30 is sized and dimensioned to allow beverage to drain therethrough but to retain a significant portion of the solid. It is anticipated that some portion of solids may pass through the filter as occurs with any brewing process but the filter can be sized and dimensioned to provide a desirable resultant brewed beverage. Beverage drained from the mixing vessel 22 flows into the container 94 positioned below the vessel 22.

The system as disclosed in FIG. 1 and throughout this disclosure provides a variety of control characteristics. As such the controller 44 can be programmed to operate the air moving device 50, the heated water delivery system 36, as well as various other features or controls throughout the system. For example, the controller 44 can control the volume of water dispensed by the water system 36, the timing of dispensing water into the vessel, the rate of pressuring the cavity 58 when positively pressurizing the cavity, the rate of draw or vacuum when the air moving device 50 operates to create a negative pressure in the cavity 58, steep time permitted during which the beverage making substance and water interact in the slurry 90 to enhance the infusion and extraction characteristics as well as other features.

During the brewing process, the introduction of water 80 creates some turbulence in the slurry 90 during the initial dispensing of water into the cavity 58. This allows for at least initial engagement of the beverage making substance 24 with the water 80 to improve, enhance, optimize, achieve or otherwise facilitate extraction of desirable characteristics from the beverage making substance 24. Additionally, the creation of negative pressure by the air moving device 50 can create additional turbulence within the slurry 90 to further controllably facilitate interaction of the beverage making substance 24 with the water 80. The interaction between the beverage making substance 24 and water in the slurry may be controlled to facilitate the extraction of desirable chemicals and compounds from the beverage making substance such as volatiles, oils, or particulates, as well as other flavor and aroma components. By use of the pressurized cavity 58 the dispensing of beverage 32 to the container 94 within the enclosed vessel helps assure that the maximum amount of flavor and aroma will be dispensed directly to the container 94. In this regard, at the end of the brewing cycle the air moving device 50 may operate for a predetermined additional period of time after dispensing of the beverage to help drive out additional aromas from the beverage making substance 24. Additionally, a small volume of air moving through the drained beverage making substance 24 may help to further drain the substance maximizing the beverage dispensed as well as facilitating some draining of the dispensed substance to facilitate easier removal from the vessel.

The apparatus 20 has been described in use by way of example but not limitation with reference to the beverage making substance 24 in the form of coffee. However, it is anticipated that other beverage making substances such as tea may be used to make beverages with the apparatus 20. In this regard, the ability to draw air 92 through the aperture 28 by use of the air moving device 50 may help enhance some of the characteristics enjoyed with tea. Some tea recipes or processes call for tea being brewed with the introduction of oxygenation. The present disclosure provides the ability to thoroughly oxygenate tea retained in a cavity 58. Additionally, this system may be useful to help compressed, rolled, capsulized, or otherwise contained tea products to bloom during the brewing process. In this regard, some of the blooming teas may benefit from the agitation and movement created by air being drawn through the aperture.

Additionally, the filter 30 not only filters the beverage making substance 24 during the dispensing cycle but also helps to act as a diffuser to diffuse air 92 drawn through the aperture 28. In this regard, a relatively significant volume of air will tend to spread through the gap 84 between the base 26 and the filter 30. The numerous openings in the filter 30 allow a diffusion of air being drawn up through the vessel 22. This helps to enhance the action of air bubbles moving through the slurry or other combination of beverage making substance 24 and water 80.

It has been found that some beverage making substances can be used more than once to dispense a desirable beverage. For example, at the end of the brewing cycle, the beverage making substance may be retained in the vessel 22 for use at least one more time. As a result the beverage making substance 24 may be somewhat compressed against the filter 30. However, at the initiation of a brewing cycle the air moving device 50 can be operated to draw air through the aperture 28 with it being diffused by the filter 30. The diffused air passing through the filter 30 tends to lift and remove the beverage making substance from engagement with the filter thereby allowing the beverage making substance to be intermixed with the slurry or otherwise to enhance the extraction of desirable beverage components therefrom.

The use of air agitation may also help facilitate floating the beverage making substance 24 generally on top of the water after a period of being intermixed in a slurry 90. In this regard, some beverage making substances may tend to float on top of water at the end of a mixing cycle. The turbulent action of the air infused or otherwise introduced into the slurry 90 may enhance this float or separation. For those substances that tend to create this float or raft of material the creation of this float may facilitate extraction of beverage 32. In this regard, once the material floats on top of the surface of the resultant beverage, it may make extraction of the beverage easier. Additionally, by pressurizing the cavity 58 on top of the float of material the float of material may act as a plunger or piston to somewhat wipe down the internal surfaces of the walls 60 during the extraction step.

As shown in FIG. 1, an embodiment of the air moving device "50a" is disclosed. In this device 50a, a pair of controllable air moving pumps or devices 53, 55 is provided. It may be useful to provide one positively pressurizing device or positive pressurizing pump 53 and one negatively pressurizing device, suction pump, or vacuum pump 55. Both devices are placed in communication with the top of the vessel, or otherwise connected via line 54 to the vessel 22 or may be individually connected through separate lines. If a single line 54 is used, directional check valves 57, 59 are correspondingly associated with lines 61, 63. These check valves 57, 59 help control and facilitate preferred directional movement of air through line 54 and not through the other device. For example, if the positive pressurizing pump 53 is used to drive air through the lines 61 and 54 to pressurize the cavity 58 the check valve 59 will close to prevent backflow through line 63 to the suction pump 55. This may also allow the use of different levels of precision or devices for these pumps 53, 55 in the interest of properly engineering the device for the intended use.

Figure 2:
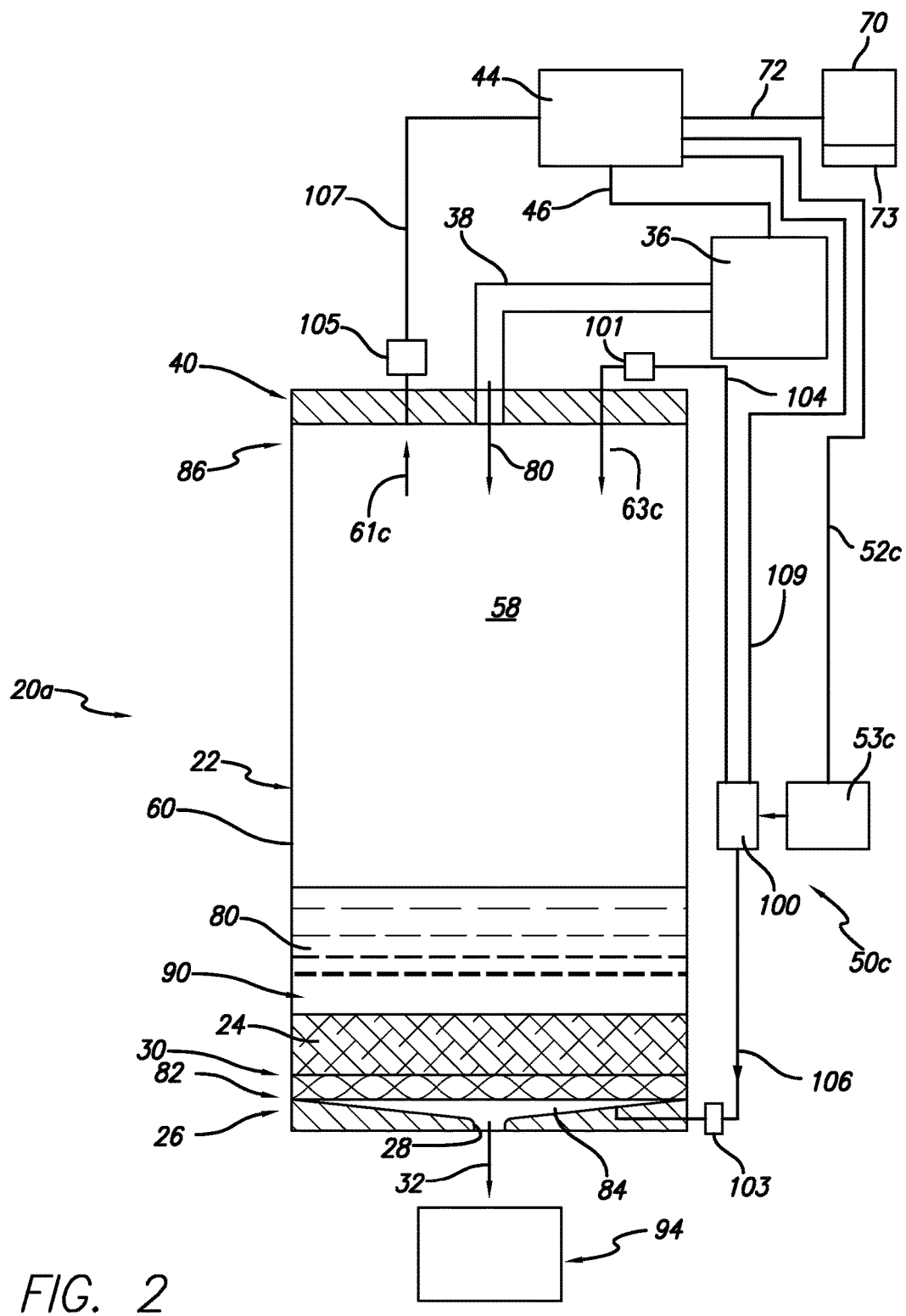
FIG. 2 is a diagrammatic illustration of a beverage producing apparatus similar to that as in FIG. 1 in which the air moving device has an alternate configuration for movement of air relative to the mixing vessel.

Turning now to FIG. 2, an apparatus 20a is shown. The apparatus 20a generally includes many of the same components as disclosed with reference to FIG. 1. However, the air moving device 50c provides an alternate embodiment whereby a diverter valve 100 can be controlled by the controller 44.

In the embodiment as shown in FIG. 2, the air moving device 50c includes the pump 53c to create a positive pressure. The diverter valve 100, is coupled 109 to the controller 44, is controlled to direct the positively pressurized air either upwardly through gap 84 as described hereinabove with reference to FIG. 1 or downwardly into the cavity 58 as also described above. This system 20a allows for a use of a single pump to positively pressurize air through the system without a suction or vacuum. This embodiment of the device requires the use of check valves 101, 103 appropriately coupled to the corresponding lines 104, 106 communicating with the diverter valve 100. Additionally, a check valve vent 105 may be provided to vent positive pressurized air 61c from the vessel 22. The vent 105 can be provided in a passive version which provides a mechanical vent operation. Alternatively, the vent 105 can be provided in an active version controllably coupled 107 to the controller 44. In general, similar operations and features will be associated with FIG. 2 as described above with regard to FIG. 1.

Figure 3:
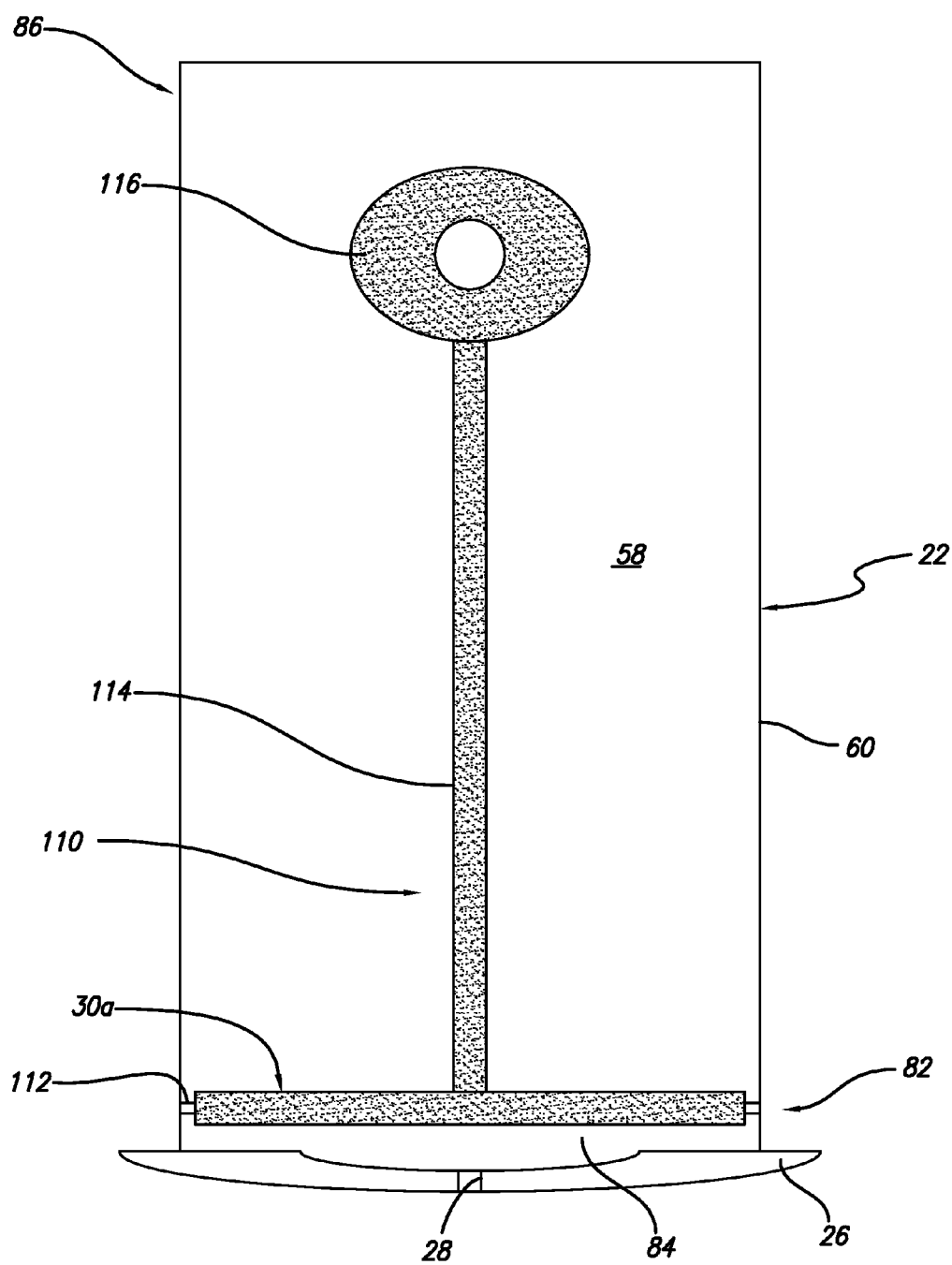
FIG. 3 is a diagrammatic illustration of an extraction device for providing removal and disposal of spent beverage making substance for use with the mixing vessel.

Turning to FIG. 3, a device for removal of spent beverage making substance is provided. In this regard, an extractor device 110 is provided. The extractor device 110 includes a version of the filter 30a as described in FIGS. 1 and 2. The filter 30a, however, is not connected to the base, the vessel, or retained between the base and vessel. Instead the filter 30a is movable within the vessel 22. The filter 30a includes a wiper 112 around the perimeter of the filter to engage the inside surface of the walls 60. A shaft 114 and grip 116 are coupled to the filter 30.

In use, the extraction device 110 is placed in the vessel prior to dispensing beverage making substance therein. Beverage making substance is then dispensed on top of the filter prior to the brewing cycle. The brewing cycle is carried out as described above with regard to the discussion of FIGS. 1 and 2. At the end of the brewing cycle the cover 40 can be removed whereby a user grabs the grip 116 and lifts up on the assembly 110. The wipers 112 engage the inside surface of the wall to facilitate thorough cleaning of the surfaces and the attached shaft 114 helps to lift the filter out of the vessel and also positions the grip 116 at a level which is convenient for a user. Once the extractor 110 is removed from the vessel it can then be moved to a location to dump the spent brewing substance therefrom and cleaned. The extractor 110 is then replaced to the vessel for future use.

In general use, the apparatus 20 is presented to the user for use in producing a beverage. Beverage making substance 24 is introduced into the vessel 22 either automatically using a dispensing system of generally known construction, or manually. Once the brewing substance 24 is placed in the vessel 22 on top of the filter 30 the brewing process can be initiated. The user operates an interface 70 to initiate the brewing process. The controller uses the selections by the user at the user interface 70 to produce a selected beverage. The controller 44 operates the water delivery system 36 to deliver water 80 to the cavity 68 for mixing with the beverage making substance 24. At the initiation of this brewing cycle, the air moving device 50 is activated by the controller 44 to initiate creating a suction, vacuum, or negative pressure on the cavity 58. Inducing the vacuum 61 on the cavity 58 causes air 92 to flow through the aperture 28 or at least creates a negative pressure to hold the liquid in the vessel. The pressure of the vacuum can be balanced by the controller to provide a generally neutral condition whereby beverage 32 does not flow out through the aperture nor does a significant or substantial amount of air 92 enter through the slurry. If the system is not capable of providing a dripless hold, it may be preferable to error on the side of drawing in air over allowing dripping. This controlled vacuum can be used to allow the beverage brewing substance 24 and water 80, combined in the slurry 90, to steep.

The controller 44 can initiate a control cycle associated with the air moving device 50 to create a controlled agitation of the slurry 90. Controlled agitation can include a generally continuous stream of air 92 flowing into the cavity, through the aperture 28, and slurry 90. The air moving device 50 can be controllably operated by the programming of the controller to be turned on and off or increased or decreased in pressure to create a pulsing agitation effect. The pulsing agitation effect may be useful in order to lift or agitate the slurry 90 and allow the particles of the beverage making substance to settle and continue to steep. The controller is designed to be preprogrammed, user programmed or a combination of both. The programming operates the apparatus and controls the dispensing of water and the air moving device in accordance with beverage making recipes or selected resultant extractions and flavor profiles and/or characteristics. The present apparatus may incorporate the BrewWise® technology developed by Bunn-O-Matic Corporation, the assignee of the present application. U.S. Pat. No. 7,223,427, issued May 29, 2007 includes disclosure of BrewWise® technology and is incorporated herein by reference in its entirety.

All versions of control cycle timing, pulsing and any other variation of control of the air moving device 50, are intended to be broadly included in the present disclosure. This broad disclosure of the control of the air moving device 50 is intended to be used with currently known recipes, standards, protocols, traditions, customs or any other brewing or beverage making technique currently known or hereafter developed or discovered which may be usable with and achieved by the air moving device 50.

Additionally, the air moving device 50 can be used to positively pressurize (63) the cavity 58 during the vacuum agitation process to allow some quantity of beverage 32 to be dispensed during the brewing cycle. Once again it is intended that the full control and broad interpretation of the air moving device 50 is intended to be included within this disclosure, including positive pressurization of the cavity 58. Additionally, the alternative version of the air moving device 58a is intended to be broadly interpreted based on the teachings provided herein.

At some point during the beverage making cycle based on the programming of the controller, sufficient control of the beverage making substance 24 and water 80 will be achieved and a preferred finished beverage is ready to be dispensed from the vessel 22. At this point the air moving device can be used to positively pressurize the cavity 58 of the vessel 22 to drive beverage 32 out of the vessel 22 through the aperture 28. As noted above, some degree of beverage making substance 24 may have risen to the upper level of the water 80 forming a type of piston or raft of material. Positively pressurizing this accumulation may act as a wiper to help facilitate removing beverage making substance from the wall 60 of the vessel 22.

At the end of the brewing cycle and dispensing beverage from the vessel 22, a continued flow of air 63 may be used to drive moisture from the spent brewing substance 24. This somewhat drained or dried brewing substance may be easier to remove from the vessel 22 than moist slurry.

The vessel 22 can then be removed from the apparatus 20 for cleaning. The top 40 and bottom 26, either alone or in combination can be releasably and reattachably removed from the vessel 22 to allow cleaning of the interior surfaces. The cleaning process can be carried out manually or in an automated version or some combination thereof keeping within the intended broad coverage of the present disclosure.

Figure 4:
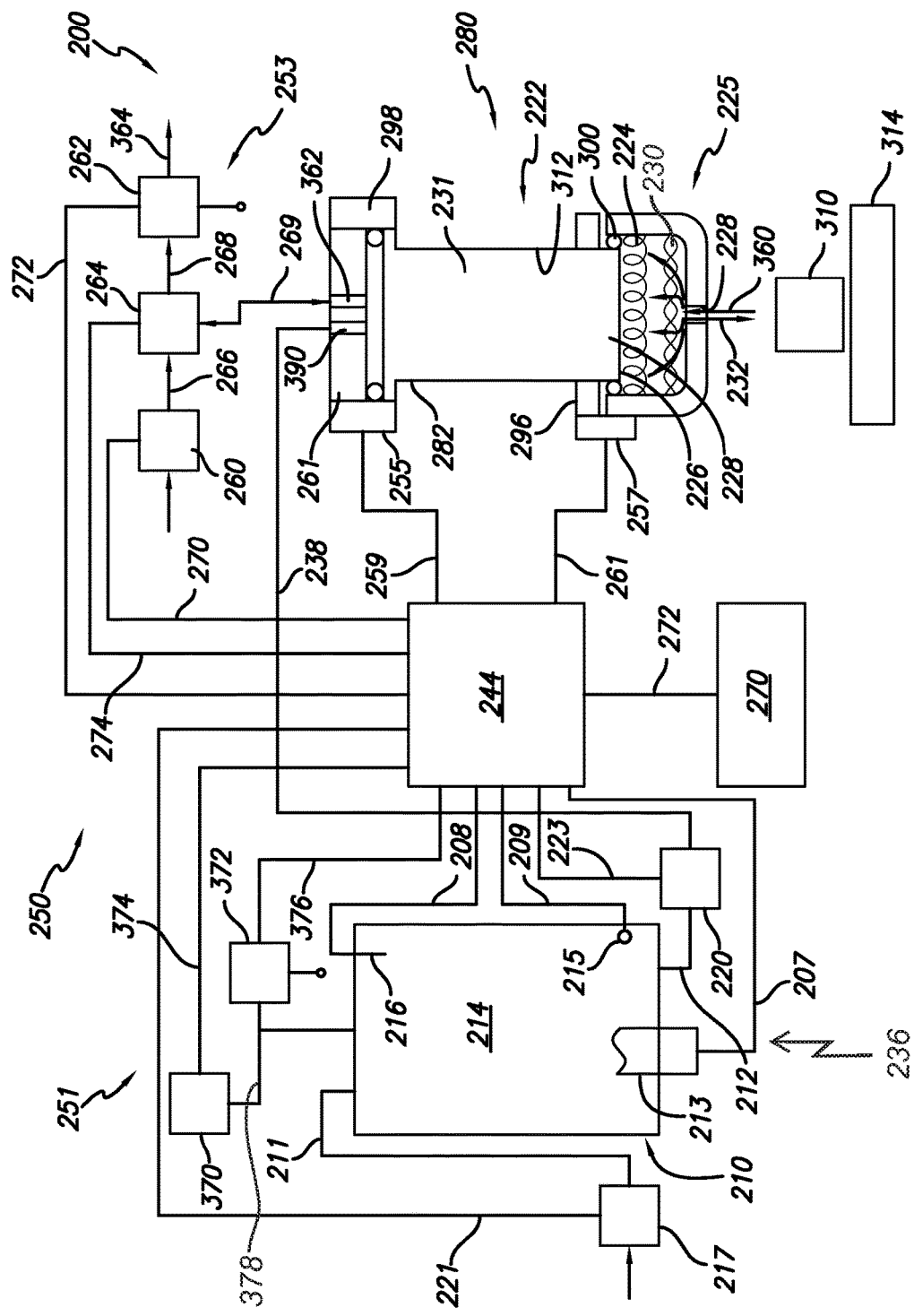
FIG. 4 is a diagrammatic illustration of a beverage making apparatus, systems, and methods and will be used to describe the methods which include heated water delivery system, an air moving device, a controller coupled to the water delivery system and air moving device, a user interface coupled to the controller, a mixing vessel or column including a holder for receiving a beverage making substance and water for mixing a slurry for production of a beverage which is moved through a filter for dispensing into a container.
Figure 5:
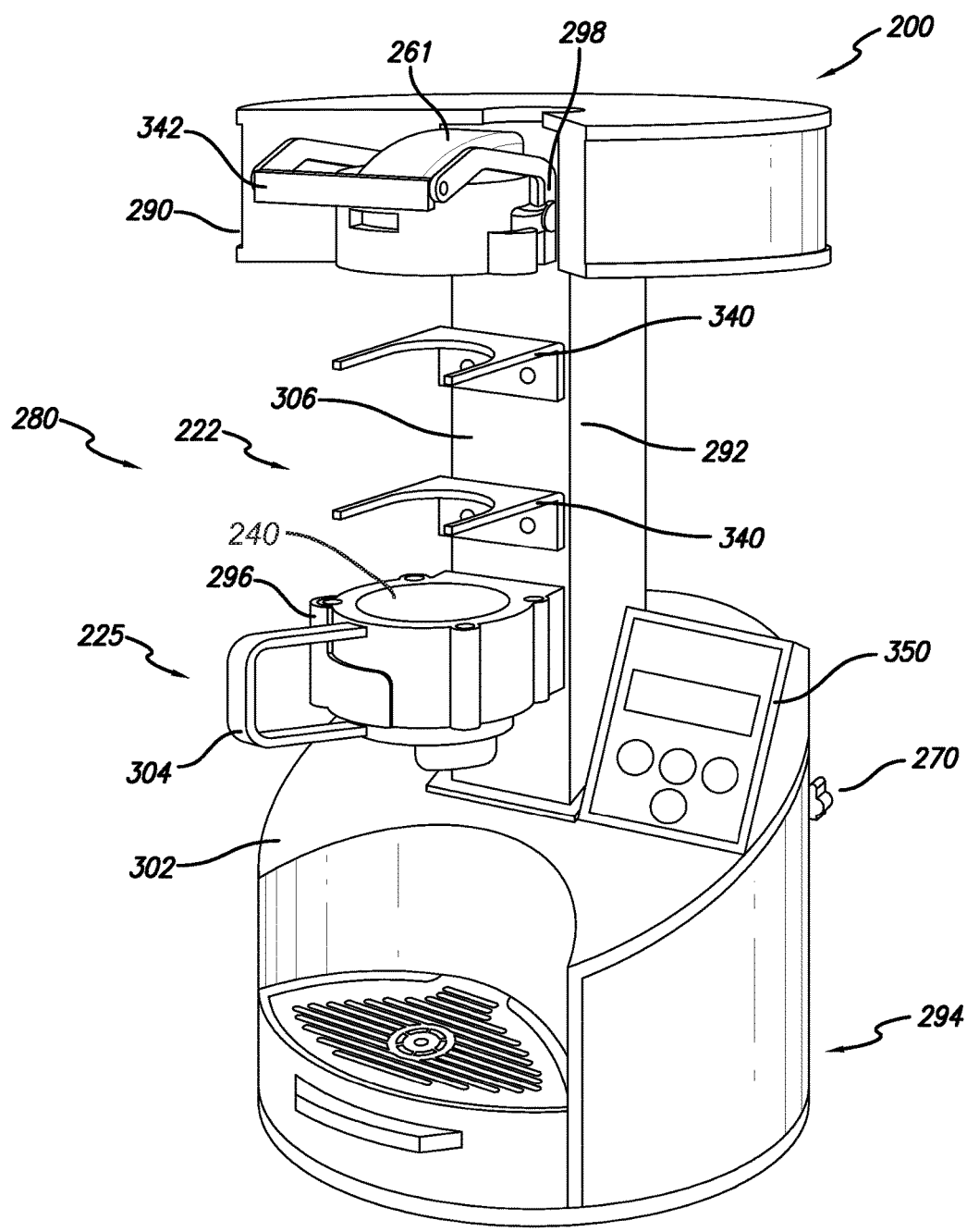
FIG. 5 is one embodiment of a brewer as disclosed herein including a upper or hood portion, a support, a platform, a cover sealing an upper opening of the vessel, a base which help retain the vessel relative to the holder, and the user interface being positioned on the platform of the machine relative to the mixing vessel.
Figure 6:
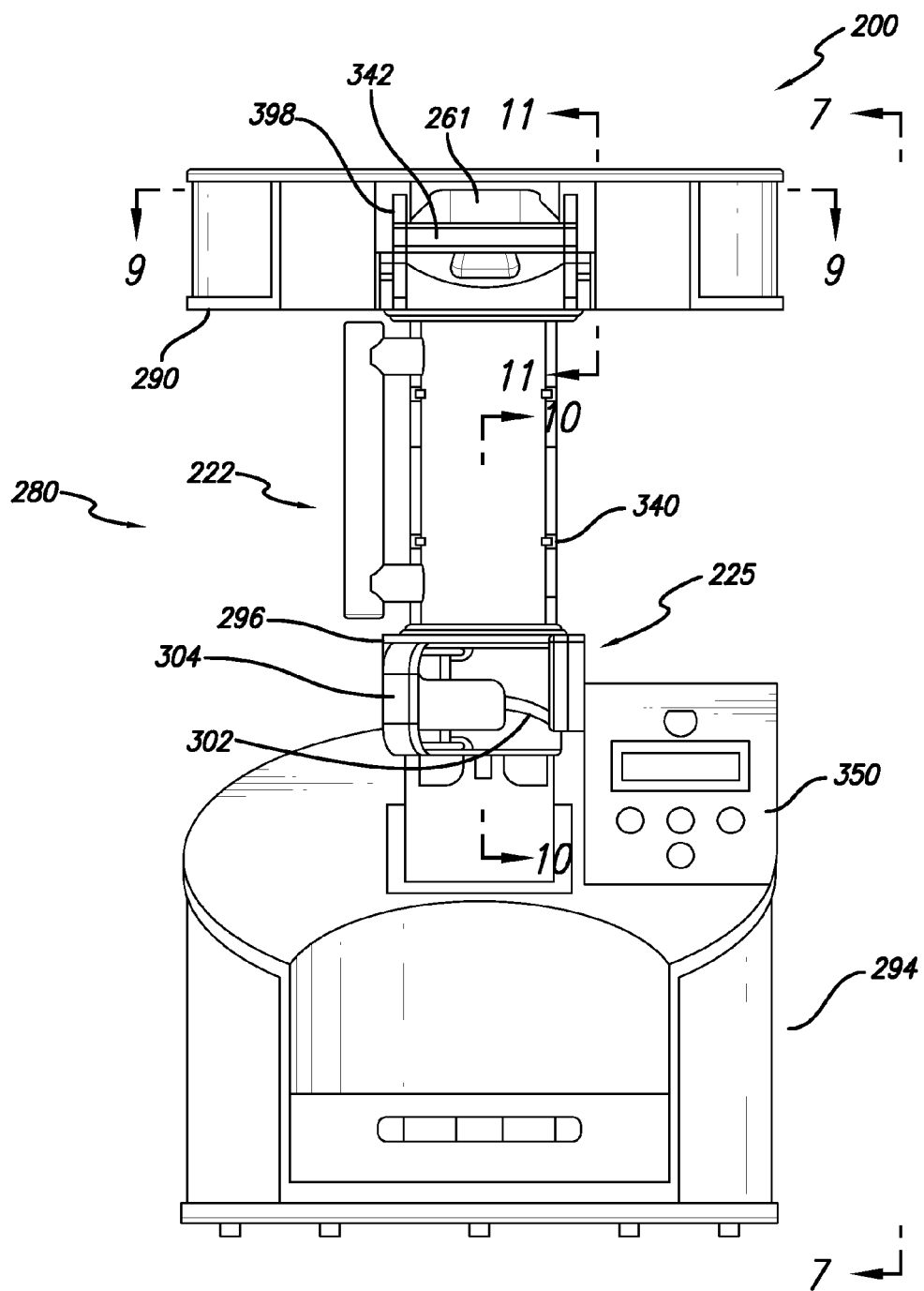
FIG. 6 is a front plan view of the brewer as disclosed in FIG. 5.
Figure 7:
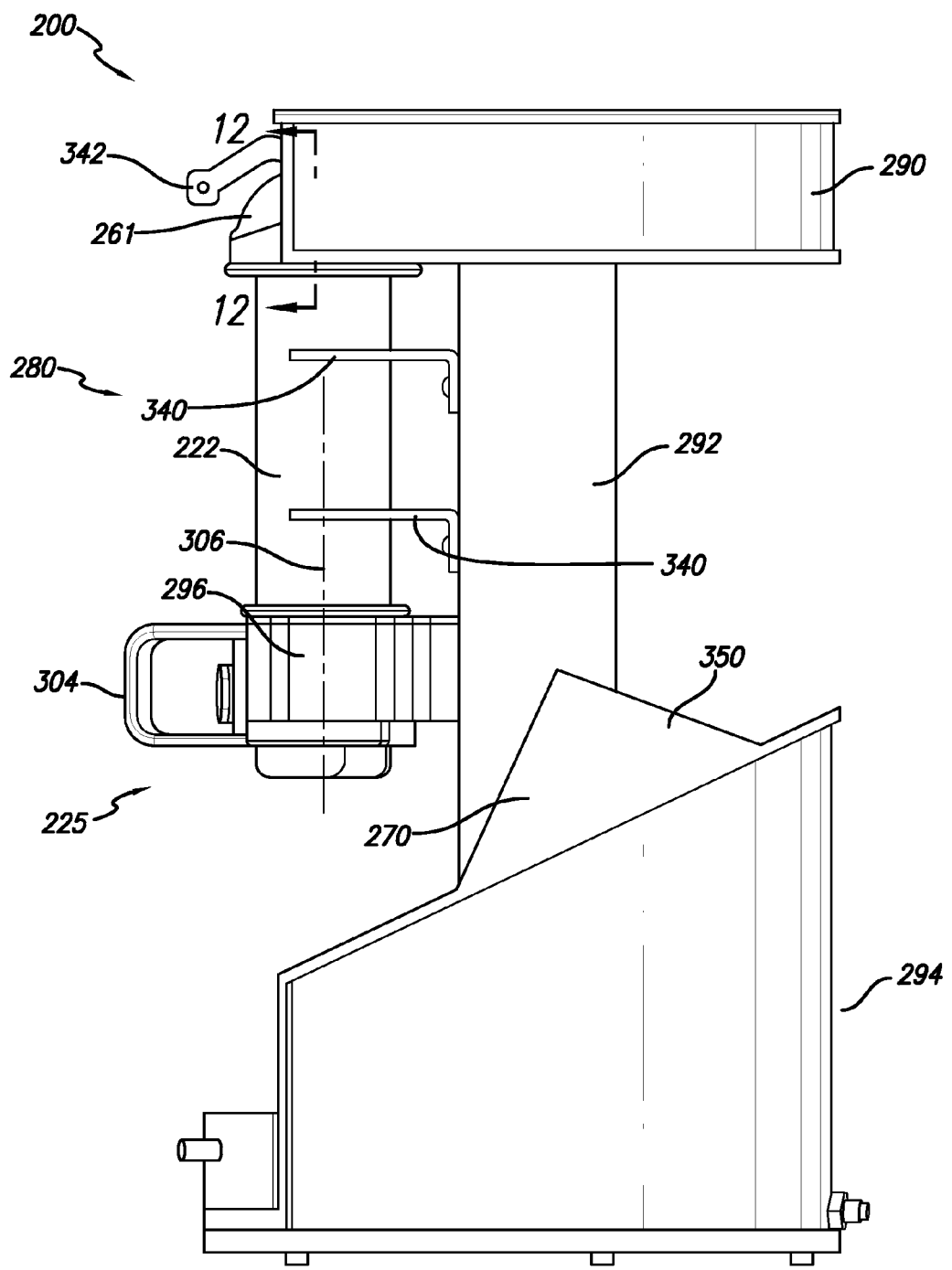
FIG. 7 is a side plan view taken along line 7-7 in FIG. 6.
Figure 8:
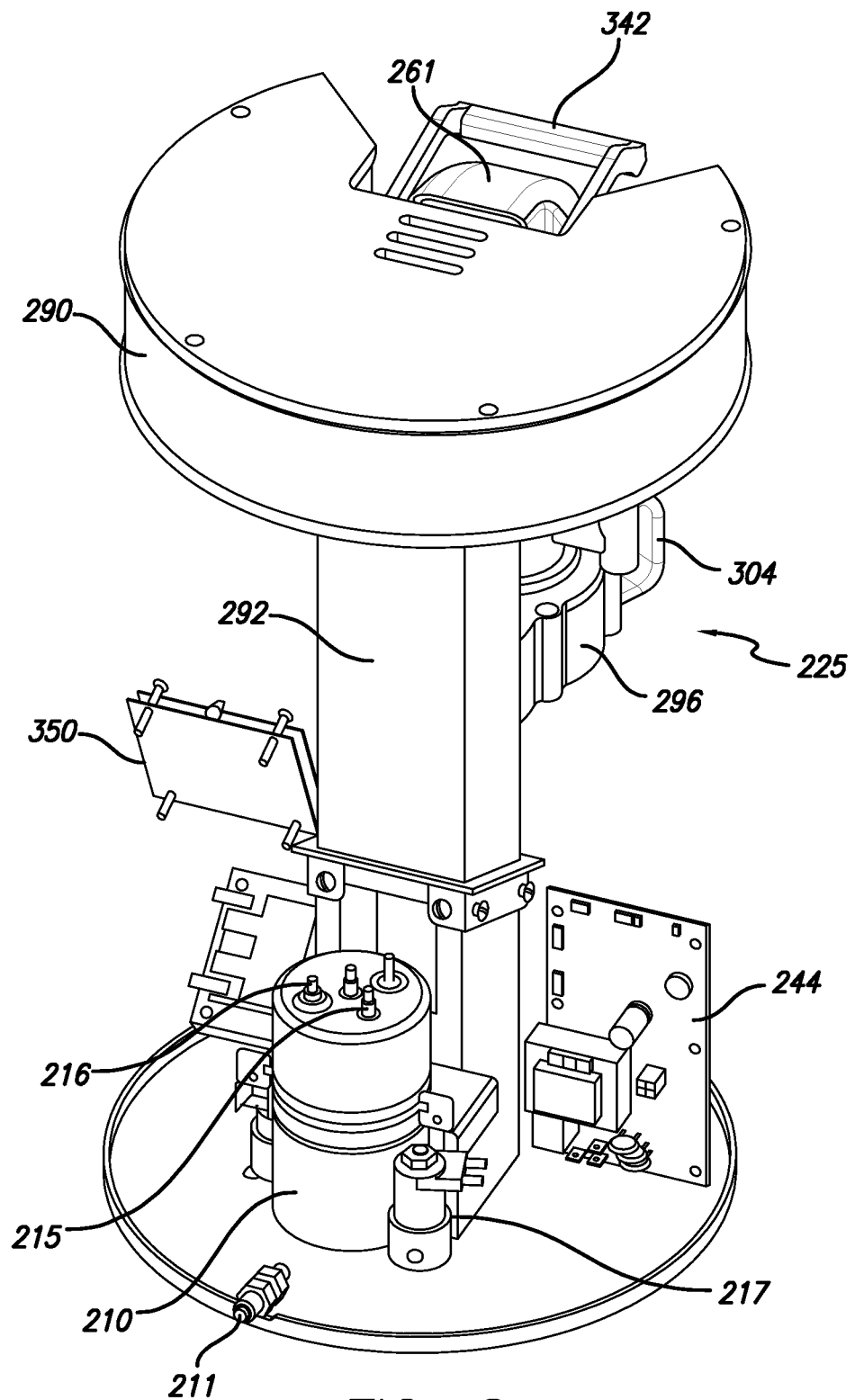
FIG. 8 a reverse perspective view in which platform lower body panels have been removed from the machine to reveal components associated therewith.
Figure 9:
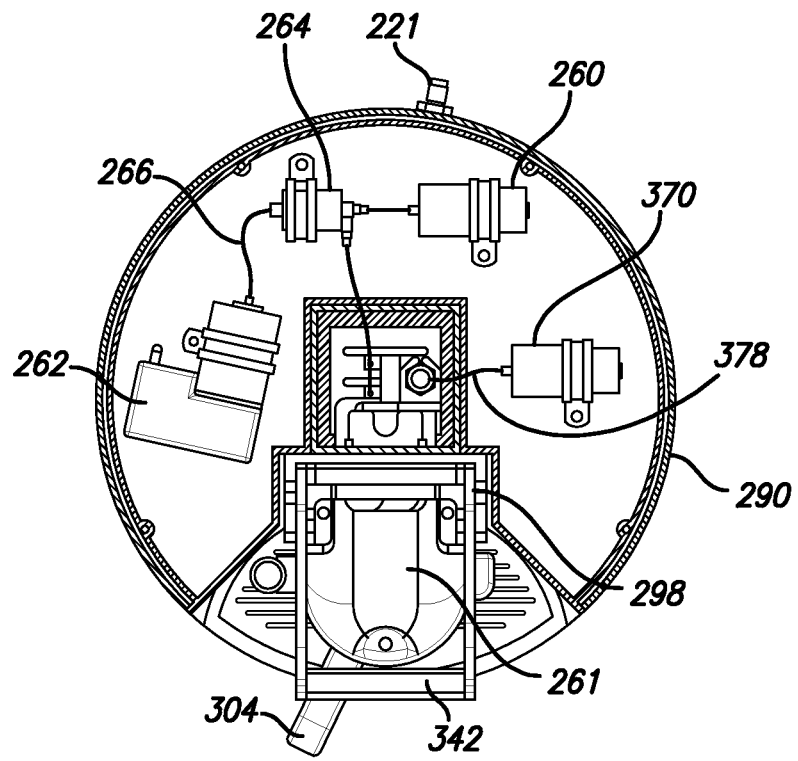
FIG. 9 is a top plan view taken along line 9-9 in FIG. 6 showing components retained within the hood including a vacuum pump, a three way valve, an air pump associated with the brew vessel, and an air pump cooperative of communicating with the heated water system.
Figure 10:
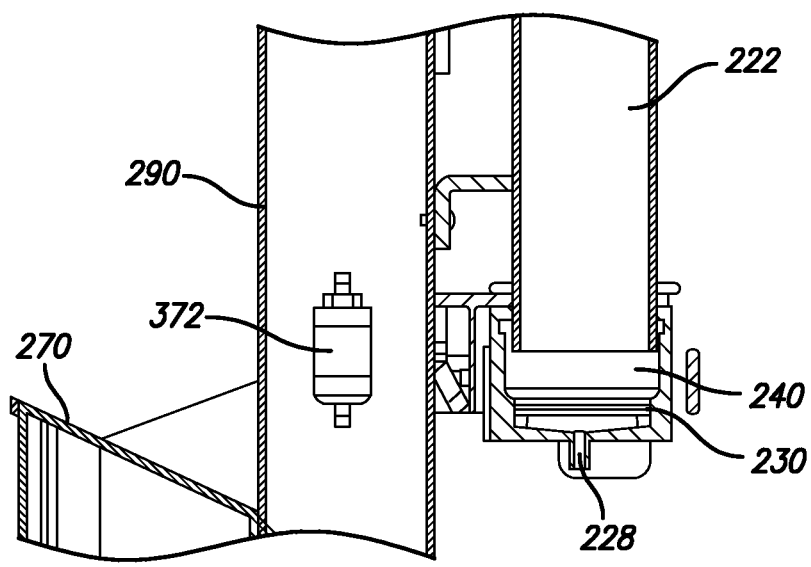
FIG. 10 is a partial fragmentary side, cross-sectional view taken along line 10-10 in FIG. 6 showing a relationship of various components of the holder relative to the vessel.
Figure 11:
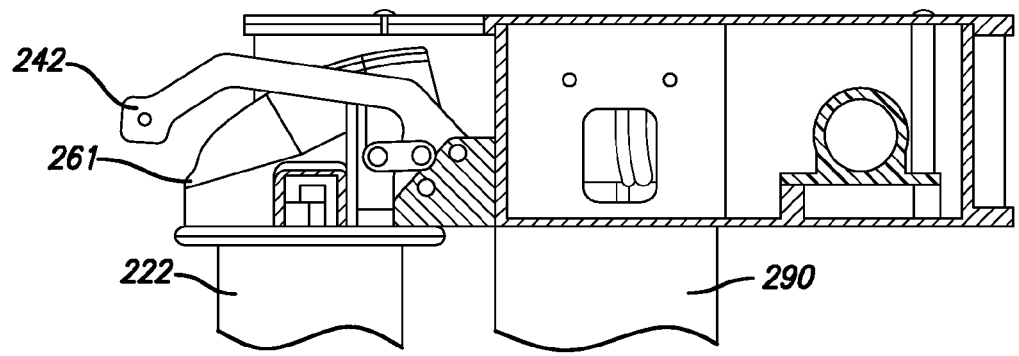
FIG. 11 is a partial fragmentary, cross-sectional side elevational view taken along line 11-11 in FIG. 6 showing a relationship of the cover to components of the hood and the vessel.
Figure 12:
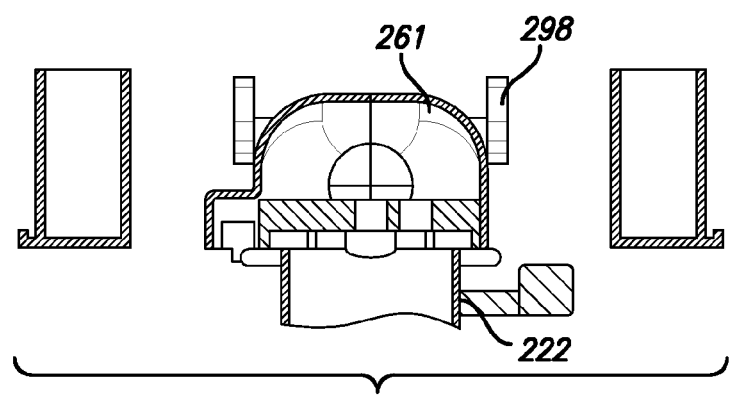
FIG. 12 is a cross-sectional, partial fragmentary view taken along line 12-12 in FIG. 7.

With reference to FIG. 4, the structures and functions as originally disclosed in FIGS. 1 and 2 will be discussed in another embodiment of the system. The operational control of the system includes various additional features and may include variations, modifications or alternatives. With reference to FIG. 4, a beverage producing and dispensing apparatus 200 is disclosed. The beverage producing dispensing apparatus includes a mixing vessel, column or vessel 222 for receiving a charge of beverage making substance 224. The vessel 222 includes a bottom 226 with an aperture or opening 228 there through. A substance holder 225 is positioned at the lower portion 226 of the vessel 222. The holder retains the brewing substance 224. The substance 224 is retained above a filter 230 also retained in the holder 225. Heated water is dispensed from a heated water delivery system 236 over dispensing line 238 to controllably deliver heated water to the vessel 222 and holder 225. Heated water 231 and brewing substance 224 combine to form slurry which is then dispensed as a brewed beverage 232 through an aperture 228 in the holder 225.

It should be noted that the present system 200 can also be configured to allow selective manual operation. As will be described in greater detail herein below, a controller 244 is provided and coupled to the heated water delivery system 236. However, the system can be manually operated whereby an operator manually dispenses water into the vessel 222 to produce a manual or customized operation such as might be accomplished by a Barista operating an espresso machine.

With reference to FIG. 4, an automatic or semi-automatic system is provided whereby the controller 244 helps to operate the overall system 200 including operation of the heated water delivery system 236. The controller 244 is also coupled to an air moving system 250 which generally includes heated water moving devices 251 coupled to and communicating with the heated water delivery system 236 as well as mixing vessel control systems 253 which moves air relative to the mixing vessel 222 to aid in the control of the brewing process.

The controller 244 is also coupled to sensors including an upper sensor 255 and a lower sensor 257. The sensors 255, 257 are coupled over lines 259 and 261, respectively, to the controller 244. These sensors are provided to indicate whether the vessel 222, cover 261 and holder 225 are in position for brewing. If the sensors 255, 257 do not detect these components 261, 222, 225 in position for brewing they provide a signal which indicates that something is not ready for brewing and the controller 244 uses this signal to lock out the heated water delivery system 236 and air moving system to prevent brewing. A corresponding response signal is transmitted to the user interface 270 via line 272.

The heated water delivery system 236 includes a heated water reservoir or tank to 210 which receives water from an inlet line 211 and dispenses water through an outlet line 212. A heater 213 is provided relative to the tank 210 to heat water 214 retained in the tank 210. A thermostat 215 and a level sensor 216 are also associated with the tank 210. An inlet valve 217 and an outlet valve 220 communicate with an operatively control the flow into (217) and the flow out of (220) of the tank 210. The control valves 217, 220 are coupled to the controller 224 via control lines 221, 223. The thermostat 215 and level sensor 216 are coupled to the controller 245 via lines 209, 208, respectively.

In use, the heated water delivery system 236 maintains water 214 at a selected and controllable temperature as detected by the thermostat 215. When the water 214 needs to be heated, the heater 213 is activated over line 207 coupled to the controller 244. The operation of the valves 217, 220 as well as the heated water moving devices 251 will be described in greater detail in the context of describing a brewing cycle.

The brewer air moving system 253 of the overall air moving system 250 as shown in FIG. 4 including a positive pressure pump 260 to create a positive air pressure, and a vacuum pump 262 to create a vacuum pressure. The pumps 260, 262 are coupled to a three way valve 264 via air lines 266, 268, respectively. The three-way valve 264 is coupled to the cover 261 via air passage 269. The pumps 260, 262 and valve 264 are coupled the controller 244 via lines 270, 272 (for the pumps, respectively) and 274 (for the valve 264).

The brewing assembly 280 includes the cover 261 which covers an upper portion or opening 282 of the vessel 222, the vessel 222 and the holder 225 which covers the lower portion 226 of the vessel 222. With reference to FIGS. 5-12, the vessel 222, cover 261 and holder 225 defines a mixing assembly 280. The mixing assembly 280 is retained on a machine body which includes an upper portion or hood 290, a support column 292, and a platform 294. A base 296 extends from the support and provides a coupling interface for the holder 225. Additionally, the base 296 provides support for the lower portion of the vessel 222. The cover 261 includes an over center clamping assembly 298 operatively retained on the support 292 and or hood 290 to provide a mechanical clamping force to retain the cover 261 on top of the upper portion 282 of the vessel 222.

In use, the components which make up the brewing assembly 280 may be retained generally relative to the support 292 and may provide access and to visibility of the brewing process. In this regard, by way of illustration and not limitation, the vessel 222 may be formed of a transparent material which allows the operator, as well as, the customer to see the interaction of the water and brewing substance. The visible brewing process may be an added performance or experience in the making of a beverage which can be beneficial to the aesthetic and/ or sale of beverages. Additionally, the brewing process may be visible to the operator or user thereby alerting the operator or user to issues or problems which might occur during the brewing process. It should be appreciated that while a visible vessel has been disclosed, the level of transparency or level of opacity is not a requirement of the device.

The visibility of the brewing process in the present disclosure 200 may be useful and distinguishing from the French press system. The French press merely shows a combination of water and brewing substance and the subsequent pressing of the slurry to result in the beverage. While in both methods of brewing the slurry can be seen, only in the present disclosure is the agitation or turbulence of the slurry shown during the brewing process.

As noted, the vessel 222 can be removed from the assembly 280. This facilitates removal of the vessel for cleaning or to even replace the vessel depending on the type of substance being brewed. In this regard, some materials or substances, as well as material and substance combinations may result in flavor carry over of one substance to the next. For example, if a strong mint tea is brewed, it is possible for some of the aromatic oils of the mint tea to be retained on a surface of a plastic vessel 222 and transfer some degree of mint flavor to the next brew cycle. If the next brew cycle involves a beverage other than mint tea, it might not be preferred to have some of the flavor from the previous mint tea brewing cycle carry over to the next brewing cycle. As such, the variety of brewing vessels could be used. Also, the brewing vessels could be in a variety of colors so as to provide different visual appeal during the brewing process or for any other reason. Another reason that a different color brewing vessel might be used is to avoid the appearance of the vessel not being sufficiently cleaned. In this regard, some brewing substances may provide a degree of dye or coloration of the vessel 222 material. As such, it may be desirable to provide a pre-colored vessel so as to minimize the negative appearance of the vessel.

In a similar manner, the brewing substance holder 225 can be removably attached to the base 296 independent of the vessel 222. In this regard, the holder 225 is configured to be retained on the base 296 and mate with a seal 300 between the holder 225 and the vessel 222. As shown, the holder 225 is engaged with a locking or retaining assembly. By way of illustration and not limitation a quarter turn locking assembly can be used with the holder 225. The quarter turn locking assembly allows the user to place the holder 225 in the base through an opening 302 provided thereon. The user operates the holder 225 by gripping the corresponding handle 304 and rotating it, in this embodiment, clockwise, to the access 306 of the brew vessel 222. The quarter turn locking mechanism includes threads which provide a degree of vertical translation to provide sealing engagement with the seal 300 retained relative to the vessel 222.

The sensor 257 is provided on the base 296 to detect the presence, absence or both presence and absence of the holder 225. Detecting the presence or absence of the holder 225 can help to prevent brewing when the system is not prepared for brewing.

The holder includes the filter 230 retained therein. The benefit of retaining the filter in the holder is that the holder can be quickly and easily attached to and removed from the base 296. In this regard, the filter 230 will travel with the holder to facilitate easy loading and removal of the brewing substance. The operation of the holder 225 as described above is familiar to coffee machine operators who may have seen or used an espresso machine. While the fractional rotation engagement may be familiar, the system in which it is used is different from an espresso machine. A cavity 240 defined by the holder 225 is sized and dimensioned to accommodate a range of brewing substance volumes. This allows the operator of the machine to also alter volume of the substance used to alter the characteristics of the resultant beverage. It is also possible that the operator can creatively blend a variety of brewing substances to produce different beverage flavors. As will be described in greater detail below, the blending of brewing substances is possibly enhanced by the method of brewing provided by this system.

After the brew cycle has completed, the spent brewing substance, having some degree of moisture content, will drain to the cavity 240. In this regard, since the holder is not transparent the at least somewhat unappealing spent brewing substance can be discretely disposed of by emptying the holder 225. The disposal of spent brewing substance is familiar to coffee maker users such that many users are familiar with emptying the porta filter as used with an espresso machine, as well as a brewing substance funnel used with drip coffee makers.

It should be noted that a variety of holders 225, having a uniform engagement mechanism, can be provided with a brewer. This allows the holder to have larger or smaller cavities 240, different mesh sizes, as well as to prevent or accommodate the flavor carryover. As described above with regard to the vessel 222, the holder 225 may be designated for a particular brewing substance to prevent carryover from one dispensing cycle to the next. The example relating to a strong mint tea described above with regard to the vessel 222 equally applies to the holder 225.

As also mentioned, a variety of filter 230 sizes may be used. In this regard, it may be desirable to provide a smaller opening or fine mesh to retain a finer grind of coffee or other brewing substance. This may be used in control the amount or degree of the particulate matter being dispensed into the beverage. The mesh size may also be varied depending on the selected vacuum air flow to be drawn through the aperture 228 of the cup and the turbulence to be produced as the air flows through the filter 230. This will be described in greater detail, below, with regard to the various agitation and extraction characteristics which might be obtained using the present disclosure. The use of permanent mesh, wire, plastic or some other porous material is environmentally sensitive and sustainable such that it can be reused many times. The use of mesh can accommodate coffee, tea, herbals, other combinations or brewing substances as well as powdered beverages. With regard to powdered beverages, an appropriately sized filter is used which will retain the powdered beverage particles prior to mixing. The mesh also may be sufficiently small so as to retain the particles in waters during the initial charge of water into the vessel 222. As a volume water is dispensed into the vessel 222 the powdered material can mix with the water through the vacuum agitation as described. At the end of the brewing or mixing cycle the combined powder and liquid beverage can be dispensed to a cup or container 310.

The brewer accommodates a clean cycle which may also be used as a preheating cycle. With regard to a cleaning cycle, a charge of water can be dispensed from the heated water delivery system 236 via line 238 to the vessel 222. This will tend to rinse material which may have accumulated on the inside surface 312 of the vessel 222. The rinsed material and rinse water can be drained into the holder 225 at a suitable collection cup or into the underlying drip tray 314. The brewing material which is rinsed off of the surface 312 is collected in the holder while some degree of rinsed fluid may collect in the drip tray or container.

The rinse cycle may also be used at the beginning of a brewing cycle to act as a preheat. In this regard, the system can be used to preheat the vessel 222 to give the material in the vessel walls a thermal charge. This may be useful in helping maintain desirable brewing characteristics as well as reducing the temperature lost during the brewing cycle. Additionally, as described, the vacuum agitation system may reduce the temperature of the beverage being brewed during the brewing cycle. As a result providing a preheating of the brewing vessel and related components of the brewing assembly 280 may help to minimize, reduce, or eliminate possible effects related to heat lost during the brewing cycle.

Turning now the operation of the brewing system 200 the user approaches the machine to make beverage for a customer. The customer chooses a brewing substance, drink selection, recipe, or other available choice or instruction and communicates the choice and/ or instruction to the operator. The operator selects a holder 225 which is appropriate for the brewing substance. Alternatively, a universal holder 225 may be provided. However, as described above, a variety of holders may be used depending on the size of the mesh, the type of material, and other characteristics. The operator makes sure that the vessel 222 is locked in position proximate to the support 292. A pair of guides 340 are provided on the support 292 to help locate and position the vessel 222. With the lower portion of the vessel fixtured on the base 296 the cover 261 can be retained in position over the upper portion 282 of the vessel 222 using the over center clamp assembly 298. The operator pulls down on the handle 342 to create the over center locking engagement of the cover 261 on the upper portion of the vessel 222. With the vessel 222 securely retained between the cover 261 and the base 296 the operator can attach the holder 225 to the base. The quarter turn engagement of the holder 225 engages the holder with the gasket to provide a seal between the vessel 222 and holder 225.

The brewing assembly 280 is now positioned on the machine in preparation for the start of the brewing cycle. At the start of the brewing cycle, the operator can use the control interface 270 to initiate the brewing cycle. The brewing cycle can be initiated by pressing a start button which will then produce a preprogrammed brew cycle routine. However, the present system 200 may accommodate or provide a wide variety of recipes, control plans, brewing profiles, or other ways of controlling the brewing process to produce a selected brewed beverage. The control interface 270 can include a display 350. The display can be a display which presents information and indicia or may be a touch screen which allows the user to operate various features of the system using the touch screen. While the interface 270 can be highly automated it can also allow an operator to provide a manual brewing experience. In this regard, the operator could program or control the hot water dispensing cycle as well as the aeration and agitation cycle. Further details regarding the control of the system 200 will be described below.

Regardless of the control method the basic methodology of the present system is to combine heated water 214 from the reservoir 210 with the brewing substance 224 retained in the holder 225. The methodology continues by including controlled aeration of the combined substance 224 and water 214 (slurry) by use of an agitation system. During the brewing cycle the controller 244 operates the vacuum pump 262 to draw air 360 upwardly through the aperture 228 in the holder 225. The vacuum draws air through the aperture 228 as a result of the three way valve 264 being operated by the controller 244 to connect the passage 268 with the vacuum pump 262. Once the controller 244 operates the vacuum pump 262 air will flow upwardly through the aperture 228, through the vessel 222, upwardly through the opening in the cover 362, and through the passage 268 through the valve 264. Air flowing as a result of the force created by the vacuum pump 262 exits the vacuum pump at the exit port 364. It should be noted that an additional benefit of the present system is to produce a potentially desirable aromatic effect by exhausting the brewing aroma through the exit port 364. The introduction of the brewing aroma can have a beneficial effect on the consumer's beverage experience as well as possibly enhance or entice a consumer or others to purchase beverages and related products.

The flow of air 360 through the aperture 228 is diffused as it flows through the filter 230. This diffusion helps to spread the airflow through the slurry retained in the brewing assembly 280. This helps to enhance the extraction of the beverage from the brewing substance. The size of the openings in the filter 230 can be selected to provide a predetermined air bubble size, range of sizes or air diffusion during the vacuum portion of the brewing cycle.

It should be noted that at the start of the brewing cycle a prewetting or small quantity of water may be dispensed from the reservoir 210 through the line 238 to prewet or moisten the brewing substance. Moistening the substance may be used to allow some degree of moisture to become absorbed or otherwise wet the substance for a variety of reasons including but not limited to out gassing. Prewetting is also useful so that when the vacuum cycle is started shortly after the wetting liquid will not drip through aperture 228 until controllably allowed to do so.

Once the brewing substance 224 is wetted the controller 244 can operate the vacuum pump 262. The vacuum pump can be controllable so as to control the force of the vacuum induced by the pump 262 creating a draw on the vessel. As such, at the beginning of the brewing cycle when there is not much slurry, liquid and beverage making material, to be retained against the force of gravity outwardly through the aperture 228, the pump can be throttled down so that only a small vacuum force is used. As water is continued to be dispensed into the vessel 222 the force of the vacuum can be controllably increased. It will be understood that as the volume of water is increased in the vessel 222 the force of gravity which would normally cause the water to flow through the aperture 228 can be counteracted by the vacuum force created by the vacuum pump 226. This level of control of the system is provided by way of illustration and not limitation.

A variety of brewing characteristics and extraction recipes or formula can be devised using the present system 220. The system provides previously unknown control of agitation with the brewing cycle. The use of a vacuum pump also eliminates a need for an outlet control valve which reduces the costs, increases the reliability, and increases the control associated with the brewing cycle. While an outlet control valve may be used with the system, it may not be required. The control valve generally provided only a binary, open/close operation and did not allow a range of airflow to interact with the brewing substance and water Additionally, the controllable vacuum force can be used to have an effect on the temperature of the beverage. In this regard, uncontrolled vacuum agitation of the substance in the brewing vessel can result in temperature loss. This is due to the heat exchange which occurs when the air drawn through the aperture 228 draws heat out of the brewing slurry and exhausts the heat through the exhaust port 364. In order to better control the temperature of the brewing cycle, the vacuum can be increased or decreased. This control of the vacuum can also provide a steeping effect for a beverage. In this regard, the vacuum pump can be operated in a pulsed or ramped control. The pulse can allow for some degree of rather vigorous agitation followed by a reduction in the vacuum only sufficient to prevent the outflow of beverage, as well as any level of agitation in this range. This results in the regular or irregular controlled agitation of the beverage making substance. The control of the agitation may help to control the degree of heat exchange during the brewing process.

At the end of the brewing agitation process, the three way valve is operated to transfer the flow of air through passage 268 through the vacuum pump 262 to allow a flow of air through passage 266. The vacuum pump 262 is turned off and the positive pressure pump 260 is turned on. Air is drawn through the positive pressure pump 260 and driven through passage 266. The flow continues through the line 268, through the cover 261 and into the vessel 222. The positive pressure on the slurry creates a force on the slurry which tends to drive the beverage downwardly through the filter 230 and out through the aperture 228. Beverage 232 flows under the control of the vacuum pump 262, the positive pressure pump 260 can also be controlled. Controlling the positive pressure pump can also provide a degree of steeping during the dispensing portion of the cycle.

It should also be noted that at the conclusion of the vacuum portion of the brewing cycle a pause can be provided to allow some degree of settling of the brewing substance from the slurry. Agitated or aerated brewing substance tends to float to the surface during this resting portion. This can be advantageous during the dispensing portion in which the positive pressure pump provides air to the vessel such that the brewing substance material that rises to the top of the slurry may act as a puck or wiper to help remove at least some substance from the inside walls 312 of the vessel 222. The rising of the brewing substance on top of slurry also tends to help free material from the filter allowing for smoother passage of beverage through the filter during the dispensing portion of the cycle.

During the brewing process, of course, heated water 214 is being dispensed from the tank 210. Dispensing of heated water from the tank is controlled by the tank air moving system 251. This system includes a positive pressure pump 370 and a controllable vent 372. The positive pressure pump is coupled to the controller 244 via line 374 and the vent is controllably coupled to the vent 372 is coupled to the controller 244 via line 376. An air passage 378 is coupled to the positive pressure pump 370, vent 372, and tank 210. Water is controllably introduced into the tank 210 by controlled operation of the inlet valve 217. Water is controllably dispensed from the tank 210 through control of the outlet valve 220. When a brewing cycle is activated the controller 244 operates the outlet valve 220 to allow water to flow from the tank 212 through line 238 to the mixing vessel 222. The valve 220 can be opened and closed so as to produce a pulsing effect of water fed into the vessel 222. The flow rate can also be affected by use of the positive pressure pump 370 such that a positive pressure within the tank 210 can increase the flow or pressure of the water flowing into the mixing vessel 222. The level detector 216 provides feedback to the controller 244 in the overall operation of the water dispensing cycle.

The recipe control functions on the present system 200 are numerous. A relationship exists involving the beverage making substance and the contact time with the associated liquid, namely, water. However, other factors include the degree of agitation or intimate contact with the brewing substance of water. In other words, the floated or agitated interaction of brewing substances such as ground coffee particles or tea leaves may produce a different beverage result than if the beverage substance were allowed to settle to the bottom of the brewing vessel. This may help to evolve the complexity and details associated with the brewing substance and flavors and produce, optimal, preferred, controlled, repeatable, selectable, or different as well as other extraction results.

The present system also may be used to control temperature during the brewing process and of the resultant beverage. As previously noted, the vacuum pump 262 can be controllably operated to increase or decrease the agitation of the brewing substance. This can also be used to increase or decrease the temperature of the brewing slurry or the heat transfer. In this regard, if it is chosen to decrease the temperature of the slurry during the brewing process this can be accomplished by increasing the agitation. The recipe designer has the ability to balance the decrease in temperature with the increase or decrease in the rate of agitation and intimate contact between the brewing substance and water. The present disclosure allows for such enhanced degree of brewing control.

The vacuum can be continuously drawn on the vessel thereby maintaining a continuous agitation or may be pulsed to increase a lofting of the particles whereupon they may be allowed to settle to some degree after the entrainment.

Similarly, the water used in the brewing process can also be pulsed. As noted the pressure can also be increased or decreased. The use of the vent 372 can be used to increase or decrease the range of the flow out of the dispensing aperture 390 in the cover 261. As such, a variety of interactive brewing control features can be used by the operator.

Additionally, this variety of extraction controls can be preprogrammed in a recipe which is then called up on the interface 270 or fed to the interface 270. Information can be fed to the interface 270 by use of a variety of information transfer media such as RFID, magnetic media, bar code scanning, induction transfer, or any other method of information transfer between a media and the interface 270. The interface 270 is provided with the appropriate media reading device so as to allow the transfer of information from a media device to the controller 244.

The present disclosure is also useful for a variety of brewing substances which may benefit from enhanced agitation as well as steeping. For example, a variety of teas may be provided in a compressed or reduced size. Such teas tend to be flower blossoms or other botanicals. However, tea leaves of another variety may also be provided in whole or partial larger form compared to the more pulverized or powdered versions of tea. The use of the agitation system may help to control the temperature associated with the tea brewing process so as to coordinate the temperature of the brewing slurry with the tea. Also, the agitation can help to open up or blossom the tea so as to enhance the contact of the water with the brewing substance. Also it is possible that some oxidation may occur to the tea as it is being brewed which may enhance the flavor and other characteristics and brewing or extraction results. Further, as previously noted, the system 200 can be used to steep such that the tea or other brewing substance can be allowed to settle in the brewing substance with a nominal degree of agitation so as to provide a steeping effect. The steeping effect can allow other materials to dissolve, melt or otherwise be transferred from the brewing substance to the liquid brewing media such as water. Water is referred to herein by way of illustration and not limitation, and water is not intended to be the only or exclusive brewing medium. For example, milk based liquids, juices, or other liquids may be used in the brewing process.

As an additional consideration, the transparent brewing vessel 222 can be illuminated so as to further enhance the visual appeal of the brewing process. This may be appealing depending on the color of the brewing substance and the type of brewing substance used. For example, as previously referred to, a variety of teas may be provided in a flower blossom form which then open or bloom during the brewing process. The use of the agitation by the vacuum pump 262 may help the brewing substance to bloom and thus provide a greater beverage performance during the brewing process. The use of lighting either provided on the support 292, base 296, cover 261 or any other portion of the machine may be controlled during the brewing process to enhance the beverage experience.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A method of making a beverage comprising the steps of:
providing a vessel having a first end and a second end spaced from the first end of the vessel at least partially defining a cavity for receiving liquid and beverage making substance;
a filter in the vessel proximate the second end;
providing a controllable air moving system communicating with the vessel, the air moving system comprising a positive pressure pump directly communicating with the cavity of the vessel and a vacuum pump directly communicating with the cavity of the vessel;

depositing beverage making substance into the vessel from the first end above the filter;

depositing liquid into the vessel from the first end above the filter;

controllably operating the air moving system to move air through the vessel to mix the beverage making substance and the liquid;

creating a vacuum in the cavity of the vessel with the vacuum pump for controllably agitating a combination of liquid and beverage making substance in the cavity during a beverage making process; and dispensing beverage from the vessel by controllably creating a positive pressure in the cavity of the vessel with the positive pressure pump.

2. The method of making a beverage as in claim 1, further comprising:

placing at least one of the positive pressure pump and the vacuum pump in communication with the vessel;

operating at least one of the positive pressure pump and vacuum pump to controllably move air relative to the vessel to mix the beverage brewing substance with the liquid;

stopping communication of the at least one pump with the vessel;

placing the positive pressure pump in communication with the vessel; and operating the positive pressure pump to controllably press beverage out of the vessel through a dispensing opening.

3. A method of making a beverage comprising:

providing a vessel having a first end and a second end spaced from the first end of the vessel for receiving beverage making substance;

a filter in the vessel proximate the second end;

providing a controllable air moving system communicating with the vessel, the air moving system comprising a positive pressure pump directly communicating with a cavity of the vessel and a vacuum pump directly communicating with the cavity of the vessel;

depositing beverage making substance into the vessel from the first end above the filter;

depositing liquid into the vessel from the first end above the filter;

sealing the vessel;

controllably operating the air moving system to move air through the vessel to mix the beverage making substance and the liquid using a controllable vent operatively coupled to and communicating with the vessel;

dispensing beverage from the vessel by controllably closing the vent and creating a positive pressure in the cavity of the vessel, using the positive pressure pump, in an area above the beverage making substance and liquid; and wherein the step of controllably moving air through the vessel includes creating a vacuum in the vessel, using the vacuum pump, in an area above the beverage making substance and liquid for controllably agitating the beverage making substance and liquid in the vessel.

4. A method of making a beverage comprising:

providing a vessel having a first end and a second end spaced from the first end of the vessel for receiving beverage making substance;

providing a controllable air moving system communicating with the vessel, the air moving system comprising a positive pressure pump directly communicating with a cavity of the vessel and a vacuum pump directly communicating with the cavity of the vessel;

depositing beverage making substance into the vessel;

depositing liquid into the vessel;

sealing the vessel;

controllably operating the air moving system to move air through the vessel to mix the beverage making substance and the liquid using a controllable vent operatively coupled to and communicating with the vessel;

dispensing beverage from the vessel by controllably closing the vent and creating a positive pressure in the cavity of the vessel with the positive pressure pump; and wherein the step of controllably moving air through the vessel includes creating a positive pressure in the vessel, using the positive pressure pump, in an area below the beverage making substance and liquid for controllably agitating the beverage making substance and liquid in the vessel.

* * * * *